(12) United States Patent
Tschunko et al.

(10) Patent No.: US 6,478,521 B1
(45) Date of Patent: Nov. 12, 2002

(54) WASHER ELEMENT FOR A WHEEL BOLT AND/OR WHEEL NUT OF A MOTOR VEHICLE WHEEL

(75) Inventors: Jan Tschunko, Stuttgart; Friedhelm Söffge, Leonberg, both of (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 09/657,239

(22) Filed: Sep. 7, 2000

(30) Foreign Application Priority Data

Sep. 8, 1999 (DE) .......................... 199 42 836

(51) Int. Cl.[7] .......................... F16B 43/00; B60B 1/00; B60B 25/00
(52) U.S. Cl. .................... 411/531; 411/533; 301/35.623
(58) Field of Search ................ 411/531, 533, 411/537, 542, 546; 301/35.623, 35.625

(56) References Cited

U.S. PATENT DOCUMENTS

| | | | |
|---|---|---|---|
| 2,017,114 A | * 10/1935 | Winchester | 301/35.623 |
| 2,217,086 A | * 10/1940 | Whitacre | 301/35.623 |
| 3,386,771 A | * 6/1968 | Verdier et al. | 411/531 |
| 4,138,198 A | * 2/1979 | Brown | 411/531 |
| 4,289,061 A | 9/1981 | Emmett | |
| 6,030,161 A | * 2/2000 | Udell et al. | 411/353 |
| 6,106,077 A | * 8/2000 | Kluge et al. | 301/35.62 |

FOREIGN PATENT DOCUMENTS

| | | |
|---|---|---|
| DE | 565582 | 11/1932 |
| FR | 610 579 | 9/1926 |
| FR | 700170 | 2/1931 |
| FR | 1 452 053 | 9/1966 |
| GB | 2156469 | 10/1985 |

OTHER PUBLICATIONS

European Patent Office Search Report.

* cited by examiner

Primary Examiner—S. Joseph Morano
Assistant Examiner—Jason R. Bellinger
(74) Attorney, Agent, or Firm—Crowell & Moring LLP

(57) ABSTRACT

A washer element for a wheel bolt and/or a wheel nut of a motor vehicle wheel is mounted with one end partially in a rounded cavity of a mounting hole for the wheel and the wheel bolt is supported on the other end of the element. The washer element consists of a sleeve part with an end area formed so that it is rounded, whereby in cross section the sleeve part itself has a profiled wall with a sleeve expansion and/or a sleeve contraction.

18 Claims, 2 Drawing Sheets

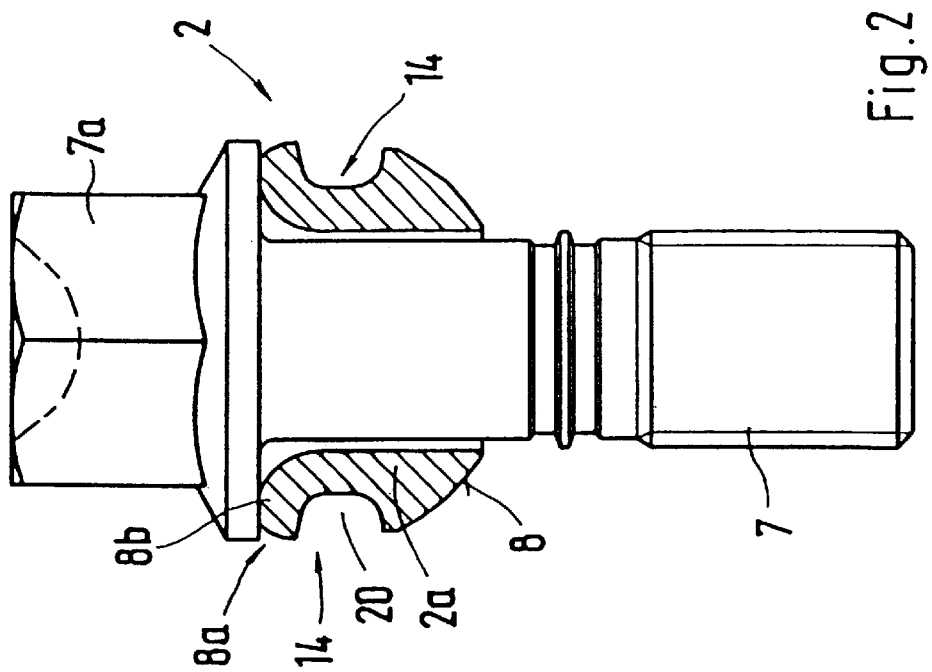
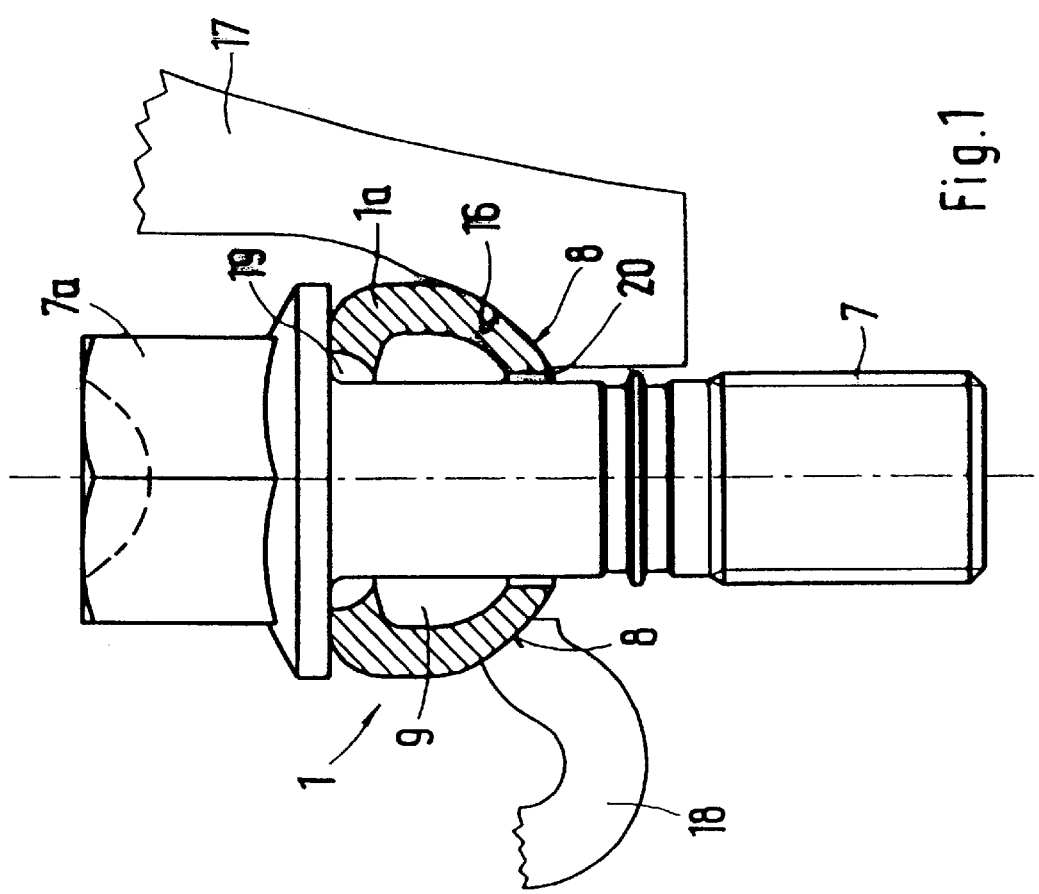

WASHER ELEMENT FOR A WHEEL BOLT AND/OR WHEEL NUT OF A MOTOR VEHICLE WHEEL

BACKGROUND AND SUMMARY OF THE INVENTION

This application claims the priority of German Patent Document 199 42 836.0, filed Sep. 8, 1999, the disclosure of which is expressly incorporated by reference herein.

The invention relates to a washer element for a wheel bolt and/or a wheel that is mounted with one end partially in a rounded cavity of a mounting hole for the wheel and with its other end supports the wheel bolt.

A washer element for a wheel nut of a motor vehicle wheel is known from French Patent Document FR-PS 1 452 053, which consists of a slit ring part. On the front side, this has a flat contact surface for the wheel nut and an opposite rounded area that is arranged in a rounded cavity that is formed to correspond of a mounted device for the wheel. A slit through the washer element causes a certain spring action when the wheel nut is tightened.

A task of the invention is to produce an improved washer element for a wheel bolt and/or a wheel nut that creates an optimally secured connection between wheel and wheel hub.

According to the invention, this task is solved by providing a washer element of the above noted type, wherein the washer element consists of a sleeve part with a rounded shaped end area and a wall that is profiled in cross section with an inner sleeve expansion and/or outer sleeve contraction.

Advantages achieved with the invention consist mainly in that a springy and elastic threaded connection is produced by the design of the washer element, which causes a secure fastening of the wheel on the wheel hub. Because of this washer element, loosening of the bolt in operation is also prevented. In addition, an expansion length is produced and the fitting precision increased.

To achieve these advantages, the washer element consists of a sleeve part with an end area that is designed so that it is rounded, whereby in cross section the sleeve part has a profiled wall with an inner sleeve expansion and/or an external sleeve contraction.

Various embodiment shapes of the washer element according to the invention are possible so that an appropriate prestress can be achieved when the bolt is tightened. Thus according to a first embodiment, the washer element consists of a profile that is c-shaped in cross section, whereby a partial inner sleeve expansion is provided that is designed with a narrowed collar opposite the rounded end area.

In addition, the inside sleeve expansion can be designed with a cylinder shape, whereby the end areas form collars turned inward toward the bolt shaft and one collar forms the rounded end area.

According to another embodiment it is also possible that the inner sleeve expansion is designed with a cone shape and the smaller diameter of the cone lies in the rounded end area, while the other end area forms a collar turned inward toward the bolt shaft and supports the bolt.

In addition, according to the invention, it can be provided that the sleeve recess of the washer element consists of at least one outside ring groove and that this is located between a collar turned outward and the rounded end area.

Further, the washer element can also consist of a cylindrical sleeve part on which the rounded end area connects with a collar turned inward. According to a first embodiment, the cylindrical sleeve part is provided on the inside with an expansion, whereby in another embodiment the cylindrical sleeve part is decreased in the wall on the inside and outside and an inside expansion and an outside contraction results.

All the embodiments of the washer elements have a rounded end area that lies in a correspondingly rounded cavity of the wheel and thus also achieves precise centering of the wheel.

The washer elements preferably consist of a steel material and lie with their rounded end area, say for an aluminum wheel, with the entire rounded surface area of the washer element of the washer element in a corresponding cavity of the wheel. In contrast with a steel wheel, only a smaller surface area of the rounded end area of the washer element contacts the cavity of the wheel.

The spring prestress that is achieved when the threaded bolt is installed is mainly achieved by the shape of the washer element, whereby the embodiment with a c-shaped profile causes a greater spring prestress than the cylindrical versions of the washer element.

Other objects, advantages and novel features of the present invention will become apparent from the following detailed description of the invention when considered in conjunction with the accompanying drawings.

BRIEF DESCRIPTION OF THE DRAWINGS

FIG. 1 shows a view of a c-profile washer element according to the invention with inner enlargement in cross section with a wheel bolt used in a steel wheel and in an aluminum wheel;

FIG. 2 shows another embodiment of a washer element with external recess and installed wheel bolt;

DETAILED DESCRIPTION OF THE DRAWINGS

Figure 3:
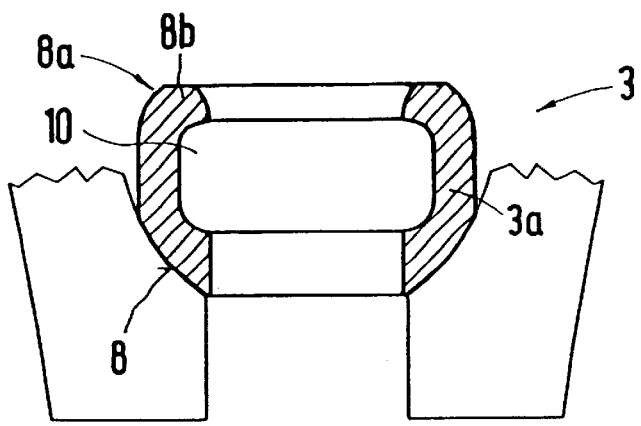
FIG. 3 shows another embodiment of a c-profile shaped washer element in cross section with an inner cylindrical enlargement in the sleeve part.

A washer element 1; 2; 3; 4; 5; 6 for a wheel bolt comprises essentially a sleeve part 1a; 2a; 3a; 4a; 5a; 6a with a rounded end area 8, whereby in cross section the sleeve part has a profiled wall with a sleeve enlargement 9; 10; 11; 12; 13 and/or with a sleeve recess 14; 15.

As shown as an example in FIGS. 1 and 2, the washer element is installed with its rounded end area 8 into a cavity 16 of the wheel 17 or 18 that is formed to correspond. The wheel 17; 18 is mounted on a wheel hub using the wheel bolt 7.

The wheel bolt 7 penetrates the washer element, whereby the bolt head 7a is supported on a collar 8b on the opposite of the rounded end area 8. The diameters D and D1 of holes 19 and 20 in the washer elements are designed somewhat larger than the bolt diameter with a certain play.

Washer elements 1 and 4 have about the same shape and consist of a sleeve part 1a; 4a with a profile that is o-shaped in cross section which has a partial inside sleeve enlargement 9; 11. The other washer element 3 is also designed with a c-shaped profile in cross section and has a sleeve enlargement 10.

Figure 4:
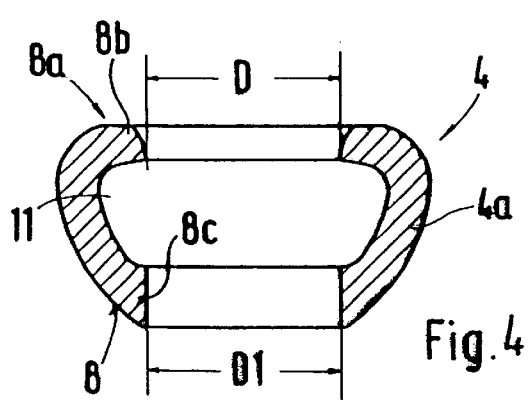
FIG. 4 shows an embodiment of a c-profile shaped washer element in cross section similar to the embodiment according to FIG. 1, shown as an individual part.

In the washer elements 1 and 4 (FIGS. 1 and 4), the inside sleeve enlargement 9; 11 has a cone shape, whereby the smaller diameter of the cone lies in the rounded end area 8 of the element and the opposite end area 8*a* forms a collar that is turned inward to the bolt shaft.

In the washer element 3 (FIG. 3), the inside sleeve enlargement is designed with a cylinder shape. The end areas 8 and 8*a* of this element 3 form a collar 8*b*, 8*c* turned toward the bolt shaft, whereby collar 8*b* supports the bolt head 7*a* and the collar 8*c* forms the rounded end area 8.

Figure 5:
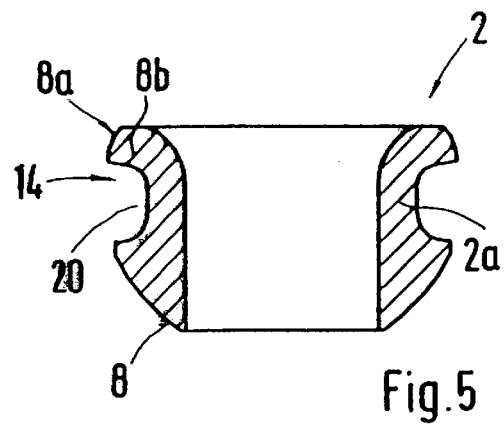
FIG. 5 shows another embodiment of a c-profile shaped washer element in cross section with outer recess.

According to another embodiment according to FIG. 5, the washer element 2 is provided with at least one external, rectangular or quadratic ring groove 20 as an external sleeve recess 14 that is located between a collar 8*b* turned outward and the rounded end area 8. According to the invention, the ring groove 20 can also have a different geometric cross section shape than the one shown, for example, triangular or a circular section.

Figure 6:
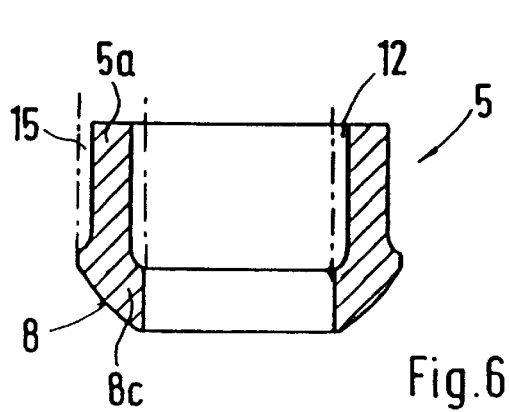
FIGS. 6 and 7 show further embodiments of a washer element in cross section with cylindrical sleeve part and inner and outer enlargement and/or recess.

According to another embodiment of the invention according to FIG. 6, the washer element 5 has a sleeve enlargement 12 formed on the inside of sleeve part 5*a* and an outer sleeve recess 15 which has the effect of a decreased wall thickness over the length of sleeve part 5*a*. On the end of this sleeve part 5*a*, an end area 8 is formed with the rounding.

Figure 7:
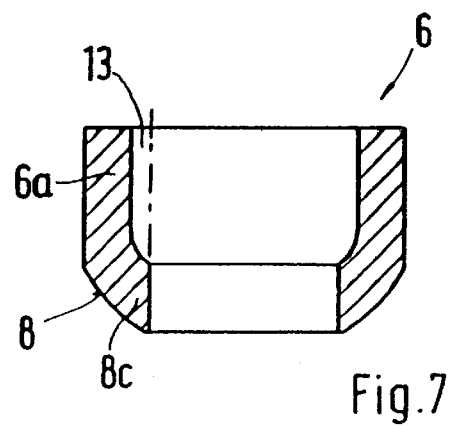

The other embodiment of a washer element 6 according to FIG. 7 is designed similar to the embodiment according to FIG. 6, whereby the sleeve part 6*a* has a cylindrical enlargement 13 on the inside that goes throughout the entire length of sleeve part 6*a* and the rounded end area 8 is turned inward and forms a collar 8*c*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle wheel assembly comprising:
   a wheel,
   a wheel bolt having a head at one end and a threaded section at another opposite end,
   a wheel hub having a rounded cavity surrounding a threaded opening, and a washer element which in use is disposed with one end partially in the rounded cavity and an opposite end engaging the bolt head when the bolt is disposed in the threaded opening clamping the wheel against the washer element,
   wherein the washer element has a rounded shaped end area engageable in use in the rounded cavity and a sleeve area extending to an opposite end area which engages in use the bolt head, said sleeve area including one of an expansion and a contraction area to facilitate a spring prestress clamping of the bolt head to the hub.

2. A vehicle wheel assembly according to claim 1, wherein the washer element is made of steel and the wheel hub is made of aluminum.

3. A vehicle wheel assembly according to claim 1, wherein the washer element is a non-slotted element.

4. A vehicle wheel assembly according to claim 1, wherein the sleeve section of the washer element exhibits a profile that is approximately c-shaped in cross section, and has a partial inner sleeve expansion that is formed with a narrowed collar opposite the rounded end area.

5. A vehicle wheel assembly according to claim 1, wherein an inside sleeve expansion is provided on the sleeve area which is configured so that it is somewhat cylinder-shaped and end areas of the sleeve area form collars that are turned inward toward the bolt shaft, whereby one collar lies in use in the rounded end area.

6. A vehicle wheel assembly according to claim 1, wherein an inner sleeve expansion is provided on the sleeve area, said inner sleeve expansion being approximately cone-shaped with a smaller diameter of the cone disposed in the rounded end area and an opposite end area forming a collar that is turned inward toward the bolt shaft.

7. A vehicle wheel assembly according to claim 1, wherein a sleeve contraction of the washer element is provided which consists of at least one outside ring groove located between a collar that is turned outward and the rounded end area.

8. A vehicle wheel assembly according to claim 1, wherein the washer element has an inner cylindrical sleeve expansion coaxial to the bolt shaft that penetrates through the entire length of the sleeve part and is turned inward toward the rounded end area and forms a collar that surrounds the bolt shaft.

9. A vehicle wheel assembly according to claim 1, wherein the sleeve area includes a cylindrical sleeve expansion arranged on an inside surface and a cylindrical sleeve contraction on an outside surface which are configured coaxial to the bolt shaft, whereby the rounded end area turned inward forms a collar which surrounds the bolt shaft.

10. A washer element for use with a vehicle wheel assembly including a wheel, a wheel bolt having a bolt shaft with a bolt head at one end and a threaded section at another opposite end, and a wheel hub having a rounded cavity surrounding a threaded opening, said washer element being adapted to be disposed at one end partially in the rounded cavity and with an opposite end engaging the bolt head when the bolt is disposed in the threaded opening clamping the wheel against the washer element,
    said washer element comprising:
    a rounded shaped end area engageable in use in the rounded cavity, and
    a sleeve section extending to an opposite end area with respect to the rounded end area, which opposite end area engages the bolt head in use,
    wherein said sleeve section includes one of an expansion and a contraction area to facilitate a spring prestress clamping of the bolt head to the hub.

11. A washer element according to claim 10, wherein the sleeve section of the washer element exhibits a profile that is approximately c-shaped in cross section and has a partial inner sleeve expansion that is formed with a narrowed collar opposite the rounded end area.

12. A washer element according to claim 10, wherein an inside sleeve expansion is provided on the sleeve section which is configured so that it is somewhat cylinder-shaped and end areas of the sleeve section form collars that are turned inward toward the bolt shaft, whereby one collar lies in use in the rounded end area.

13. A washer element according to claim 11, wherein an inside sleeve expansion is provided on the sleeve section which is configured so that it is somewhat cylinder-shaped and end areas of the sleeve section form collars that are turned inward toward the bolt shaft, whereby one collar lies in use in the rounded end area.

14. A washer element according to claim 10, wherein an inner sleeve expansion is provided on the sleeve section, said inner sleeve expansion being approximately cone-shaped with a smaller diameter of the cone disposed in the rounded area and an opposite end area forming a collar that is turned inward toward the bolt shaft.

15. A washer element according to claim 11, wherein an inner sleeve expansion is provided on the sleeve section, said inner sleeve expansion being approximately cone-shaped with a smaller diameter of the cone disposed in the rounded area and an opposite end area forming a collar that is turned inward toward the bolt shaft.

16. A washer element according to claim 10, wherein a sleeve contraction of the washer element is provided which consists of at least one outside ring groove located between a collar that is turned outward and the rounded end area.

17. A washer element according to claim 10, wherein the washer element has an inner cylindrical sleeve expansion coaxial to the bolt shaft that penetrates through the entire length of the sleeve part and is turned inward toward the rounded end area and forms a collar that in use surrounds the bolt shaft.

18. A washer element according to claim 10, wherein the sleeve section includes a cylindrical sleeve expansion arranged on an inside surface and a cylindrical sleeve contraction on an outside surface of the washer element and in each case coaxial in use to the bolt shaft, whereby the rounded end area turned inward forms the collar which surrounds the bolt shaft.

* * * * *